(12) United States Patent
Han (10) Patent No.: US 12,274,239 B1
(45) Date of Patent: Apr. 15, 2025

(54) WATER-SPRAYING AND BATHING COMB FOR PETS, AND WATER PATH CONTROL METHOD THEREFOR

(71) Applicant: LINYI QIHONG INTERNATIONAL TRADE CO., LTD., Shandong (CN)

(72) Inventor: Xipeng Han, Shandong (CN)

(73) Assignee: LINYI QIHONG INTERNATIONAL TRADE CO., LTD., Linyi (CN)

( * ) Notice: Subject to any disclaimer, the term of this patent is extended or adjusted under 35 U.S.C. 154(b) by 0 days.

(21) Appl. No.: 18/787,409

(22) Filed: Jul. 29, 2024

Related U.S. Application Data

(63) Continuation of application No. PCT/CN2023/124216, filed on Oct. 12, 2023.

(51) Int. Cl.
*A01K 13/00* (2006.01)
*A45D 24/04* (2006.01)
*A45D 24/22* (2006.01)

(52) U.S. Cl.
CPC .......... *A01K 13/002* (2013.01); *A01K 13/001* (2013.01); *A45D 24/04* (2013.01); *A45D 24/22* (2013.01)

(58) Field of Classification Search
CPC .... A01K 13/001; A01K 13/002; A45D 24/04; A45D 24/22; A61D 11/00
See application file for complete search history.

(56) References Cited

U.S. PATENT DOCUMENTS

| | | | |
|---|---|---|---|
| D633,174 S | * | 2/2011 | Lee .............................. D23/213 |
| 8,555,819 B1 | * | 10/2013 | McFarland .......... A01K 13/001 |
| | | | 119/664 |
| D721,420 S | * | 1/2015 | Hawkins ...................... D23/223 |
| 10,449,558 B2 | * | 10/2019 | Thurgood ............. B05B 1/1636 |
| 10,772,297 B2 | * | 9/2020 | Bokhari ............. A46B 11/0062 |
| D920,475 S | * | 5/2021 | Michalak ..................... D23/226 |
| 11,019,803 B2 | * | 6/2021 | Takla ................... A01K 13/001 |

(Continued)

FOREIGN PATENT DOCUMENTS

| | | |
|---|---|---|
| CN | 204261831 U | 4/2015 |
| CN | 110394251 A | 11/2019 |

(Continued)

OTHER PUBLICATIONS

International Search Report of PCT/CN2023/12421.
Written Opinion of PCT/CN2023/12421.

*Primary Examiner* — Ebony E Evans (57) ABSTRACT

The present disclosure belongs to the field of pet supplies, and provides a water-spraying and bathing comb for pets, and a water path control method therefor. Comb teeth are arranged on an outer side of a water-spraying and bathing comb main body; the water-spraying and bathing comb main body has a first front cover with circular holes with the same diameter; a water-spraying and bathing comb water outlet main body has an upper surface with conical toothed water outlet channels, and the water outlet channels pass through the circular holes; a water-dividing wall is arranged on a back side of the water-spraying and bathing comb water outlet main body, and divides the water outlet channels into first water path channels and a second water path channel; a handle has a second accommodating cavity; a water path controller is arranged in the second accommodating cavity.

5 Claims, 7 Drawing Sheets

(56) References Cited

U.S. PATENT DOCUMENTS

| | | | | |
|---|---|---|---|---|
| D937,971 S | * | 12/2021 | Gutman | D23/223 |
| D984,810 S | * | 5/2023 | Han | D4/119 |
| D1,006,955 S | * | 12/2023 | Zeng | D23/223 |
| 2009/0308951 A1 | * | 12/2009 | Suter | A01K 13/001 4/615 |
| 2021/0016304 A1 | | 1/2021 | Wu et al. | |

FOREIGN PATENT DOCUMENTS

| | | |
|---|---|---|
| CN | 211587125 U | 9/2020 |
| CN | 111838000 A | 10/2020 |
| CN | 218126257 U | 12/2022 |

* cited by examiner

WATER-SPRAYING AND BATHING COMB FOR PETS, AND WATER PATH CONTROL METHOD THEREFOR

CROSS-REFERENCE TO RELATED APPLICATIONS

This application is a bypass continuation application of PCT application no.: PCT/CN2023/12421. This application claims priorities from PCT Application PCT/CN2023/12421, filed Oct. 12, 2023, and from Chinese patent application 202222272735.2, filed Aug. 29, 2022, the contents of which is incorporated herein in the entirety by reference.

TECHNICAL FIELD

The present disclosure relates to the technical field of bathing combs, and in particular to a water-spraying and bathing comb.

BACKGROUND

With the development of family economy, more and more families choose to keep pets, and most of the pets are hairy animals, so that bathing the pets can clean the hair of the pets. Generally, the pets are bathed by using a bath shower.

At present, the bath shower for the pets in the market has insufficient water outlet length and small water outlet area, and is not suitable for bathing large pets. The overall water outlet mode is relatively simple, so the bath shower is not suitable for pets with long and lush hair. Meanwhile, the bath shower does not have a hair-combing function, has low practicability, and does not have a function of turning off a water path in the bathing process, and it is necessary to turn off water by turning off a water tap, so when the water path is required to be turned off temporarily, it is necessary to get up and turn off water repeatedly, which is inconvenient.

SUMMARY

To solve at least one of the above problems in the prior art, the present disclosure provides a water-spraying and bathing comb for pets, which can adjust the water output and temporarily turn on and off water.

To achieve the above objective, the present disclosure adopts the following technical solutions: a water-spraying and bathing comb for pets includes:
  a water-spraying and bathing comb main body, where comb teeth are arranged on at least one side end face of an outer side of the water-spraying and bathing comb main body, the water-spraying and bathing comb main body has a first front cover and a first rear cover, and an upper surface of the first front cover is provided with at least two rows of circular holes with the same diameter;
  a water-spraying and bathing comb water outlet main body, having an upper surface with conical toothed water outlet channels, where the water outlet channels pass through the circular holes and are located above the upper surface of the first front cover, a diameter of each of the water outlet channels away from an upper end face of the first front cover is less than a diameter of one end in contact with the upper end face of the first front cover, a front side of the upper surface of the water-spraying and bathing comb water outlet main body is provided with convex conical toothed water outlet channels corresponding to the circular holes, and a long U-shaped water-dividing wall is arranged on a back side and divides the water outlet channels into first water path channels and a second water path channel;
  a handle, integrally connected to the first rear cover, where a water path connecting pipe is arranged at a left end of the handle, and the handle has a second accommodating cavity;
  a water path controller, including a water path controller rear cover, a water path controller front cover connected with the water path controller rear cover to form a cavity, a water path controller central hub arranged in the cavity, and a water path controller button for controlling the water path controller central hub,
  where the water path controller rear cover is provided with a circular second water-passing cavity and a special-shaped first water-passing cavity, the first water-passing cavity has a mounting part and a flow guide part, water flow converges to the flow guide part and passes through the second water-passing cavity, a vertical plate is arranged between the second water-passing cavity and the first water-passing cavity, the vertical plate is provided with a water through hole, the second water-passing cavity and the first water-passing cavity communicate with each other through the water through hole, and water-passing holes are formed in the first water-passing cavity and the second water-passing cavity; and a switch assembly, including a button main shaft with a driving end, where an outer
surface of the driving end is fixedly connected to driving clamp teeth, the driving clamping teeth are connected to driven clamping teeth in a matched manner, the bottoms of the driven clamping teeth are respectively fixedly connected to a first button pick and a second button pick, the driven clamping teeth drive the first button pick and the second button pick to rotate horizontally, and
in an off state, the first button pick blocks two water-passing holes corresponding thereto, and the second button pick blocks one water-passing hole corresponding thereto. The present disclosure has the advantages: through the improvement on the water path structure, the first water path channels and the second water path channel are provided, the connection or disconnection of the first water path channels and the second water path channel can be controlled according to requirements, the water amount is adjusted, and the water amount is selected according to the volume and the hair amount of a pet, thereby achieving a water-saving effect and ensuring that the hair of the pet can be completely washed; secondly, the water outlet channels are conical, the structure of a water outlet is improved, and the height of a water-spraying nozzle is increased, so shat the washing area is increased; multiple rows of conical water-spraying nozzles form a toothed structure, so that the pets can be massaged while being washed and the comfortability of the pets can be improved; comb teeth are added to the front end face and the rear end face of the water-spraying and bathing comb main body, and the lengths of the comb teeth are limited, so that the floating hair on the pets can be brushed off when the pets are brushed; the skin layer deep in the hair of the pets can be cleaned, and dirt can be removed from the skin layer of the pets; the massage effect is achieved while washing, so that the comfortability of the pets in the hair washing process can be improved; and dirt in the hair can be brushed off in the pet washing process, so that the practicability is improved.

According to the present disclosure, further, the flow guide part has a rectangular groove structure with a width less than a diameter of the mounting part and a diameter of the second water-passing cavity, and water flow flows to the second water-passing cavity through the flow guide part. The rectangular flow guide part with a small width is arranged, so water flow converges to the flow guide part to compress the water amount and then passes through the second water-passing cavity to realize first pressurization.

According to the present disclosure, further, hollow cylinders are vertically mounted at the cavity centers of the second water-passing cavity and the first water-passing cavity, and reset springs are sleeved on the hollow cylinders.

According to the present disclosure, further, one side of each of the driving clamping teeth facing the driven clamping teeth is a working end, the working end of each of the driving clamping teeth is a sharp corner, an upper surface of each of the driven clamping teeth is an inclined surface, and the working end of each of the driving clamping teeth is in contact with the inclined surface of each of the driven clamping teeth. The sharp corner is in contact with the inclined surface. Under the same force, the pressure on the inclined surface is increased, and the driving clamping teeth are rapidly driven to rotate, so that the driving process is faster.

According to the present disclosure, further, the first button pick is located in the first water-passing cavity, the second button pick is located in the second water-passing cavity, reset springs are located at lower ends of the first button pick and the second button pick.

According to the present disclosure, further, the first button pick has a mirror structure, and the second button pick has a single-sheet structure, so that the water-passing hole can be effectively blocked.

According to the present disclosure, further, the first button pick has a butterfly structure; and the second button pick has a fan-shaped structure.

According to the present disclosure, further, two sides of the water path controller rear cover are respectively provided with three screw holes, the left side and the right side of the water path controller central hub are respectively and correspondingly provided with three fixed screw bases, and the screw holes are fixedly connected to the fixed screw bases; and the water path controller is fixedly connected to the water path controller central hub.

A sealing ring is arranged between the water path controller front cover and the water path controller central hub, and the water path controller front cover and the water path controller central hub are hermetically connected through ultrasonic waves.

The present disclosure further provides a water path control method for the water-spraying and bathing comb for pets. One side of the water path controller button is pressed, and the button main shaft drives the first button pick to rotate horizontally to communicate with the water-passing holes of the first water-passing cavity, so that the communication of the first water path channels or the second water path channel is realized, and at least one column of water outlet channels output water; and the side of the water path controller button is pressed again, the button main shaft drives the first button pick to rotate to block the water-passing holes of the first water-passing cavity, and a water path is turned off temporarily.

According to the present disclosure, further, on the premise of water supply, the other side of the water path controller button is pressed, and the button main shaft connected to the second button pick rotates, so that two water-passing holes of the second water-passing cavity are in a communicating state, and the first water path channels and one second water path channel output water. The advantages are as follows: through the improvement on the water path structure, three pipelines are added, so that the connection or disconnection of the first water path channel, the connection or disconnection of the second water path channel, or the simultaneous connection or disconnection of the first water path channels and the second water path channel can be controlled according to requirements; and the water amount is adjusted, and the water amount is selected according to the volume and the hair amount of a pet, thereby achieving a water-saving effect and ensuring that the hair of the pet can be completely washed.

The advantages are as follows: the water path controller button is connected to two button main shafts, the overall water supply or water outage of the water-spraying and bathing comb for pets is controlled by one side, and the water output amount is selected by the other side, so that the water-saving effect is achieved; furthermore, a proper water amount can be selected according to the size of the cleaning parts of the pets and the animal body size, so that the overall practicability is improved.

The present disclosure has the following beneficial effects:

1. the water outlet area is increased, so that the efficiency of washing large animals is improved;
2. a plurality of water outlet modes are suitable for washing different parts of the pets;
3. The water-spraying and bathing comb for pets has a function of turning off water by one button, so that use is more convenient, the water outlet mode adjustment and the water path switch are integrated into one button, and single-button operation is realized; and
4. the two sides of the water-spraying and bathing comb main body are connected to the comb teeth, so that the water-spraying and bathing comb for pets combines a brush and a shower to integrate combing and washing into one.

BRIEF DESCRIPTION OF DRAWINGS

The drawings of the specification that constitute a part of the present application are used to provide a further understanding of the present disclosure. The exemplary embodiments of the present disclosure and the description thereof are used to explain the present disclosure, and do not constitute an improper limitation of the present disclosure.

In the drawings: 1—water-spraying and bathing comb main body; 11—first water path channel; 12—second water path channel; 13—water inlet port; 14—first rear cover; 15—first front cover; 151—circular hole; 152—second inserting buckle rib; 16—first inserting buckle rib; 2—handle; 24—water path connecting port; 3—water path connecting pipe; 4—comb tooth; 5—switch assembly; 51—button main shaft; 511—driving end; 52—driving clamping tooth; 53—water path controller button; 54—first button pick; 55—second button pick; 56—driven clamping tooth; 57—reset spring; 58—stop block; 6—water-spraying and bathing comb water outlet main body; 61—water outlet channel; 62—second front cover; 621—screw; 63—second rear cover; 64—U-shaped water-dividing wall; 7—handle rubber-coating sleeve; 8—water path controller; 81—water path controller rear cover; 811—second water-passing cavity; 812—first water-passing cavity; 8121—mounting part; 8122—flow guide part; 813—water-passing hole; 814—water through hole; 82—water path controller central hub; 83—water path controller front cover; 88—hollow cylinder.

DETAILED DESCRIPTION OF THE EMBODIMENTS

To better explain the present disclosure and facilitate understanding, the present disclosure is described below in detail with reference to the accompanying drawings and through specific implementations.

A water-spraying and bathing comb for pets provided by one embodiment of the present disclosure, as shown in FIG. 1 to FIG. 15, includes a water-spraying and bathing comb main body 1; the water-spraying and bathing comb main body 1 has a first front cover 15 and a first rear cover 14; the first front cover 15 is located above, and the first rear cover 14 is located below; one end of the first rear cover 14 is integrally connected to a handle 2; the handle 2 has a rubber handle rubber-coating sleeve 7 with concave patterns; preferably, the shape of the handle 2 is a half-angle arc-edge square; a surface of the first front cover 15 located above is an upper surface, and the upper surface is concave; when in contact with a pet, the upper surface is more in line with the body curve of the pet, so that the hair of the pet can be combed and washed better; a water path connecting pipe 3 is arranged at a left end of the handle 2; a left-right block rib and an upper reverse blocking rib are arranged at the junction of the first rear cover 14 and the handle 2, and are configured to fix a water-spraying and bathing comb water path controller; four fixed screw bases are arranged on one side of the first rear cover 14 of the water-spraying and bathing comb main body 1 facing the first front cover 15, and are configured to fix a water-spraying and bathing comb water outlet main body 6; the top end of the water-spraying and bathing comb water outlet main body 6 is provided with a screw reinforcing socket for fixing the first front cover 15 and the first rear cover 14 of the water-spraying and bathing comb main body 1; an upper surface of the first front cover 15 is provided with a screw socket; the position of the screw socket corresponds to the screw reinforcing socket; and the first front cover 15, the water-spraying and bathing comb water outlet main body 6 and the first rear cover 14 are fixed into an integrated structure sequentially from top to bottom by screws. Three first inserting buckle ribs 16 are arranged on each of two sides of the water-spraying and bathing comb main body 1; the first inserting buckle ribs 16 are fixedly connected to comb teeth 4; and the comb teeth 4 are located on two sides of the water-spraying and bathing comb main body 1 in a width direction. By adoption of the structures of the first inserting buckle ribs 16, when hair on the comb teeth 4 is excessive or the comb teeth are damaged, the comb teeth can be disassembled and cleaned or replaced with new comb teeth 4, so that cleaning is facilitated and the cost can be reduced.

Figure 11A:
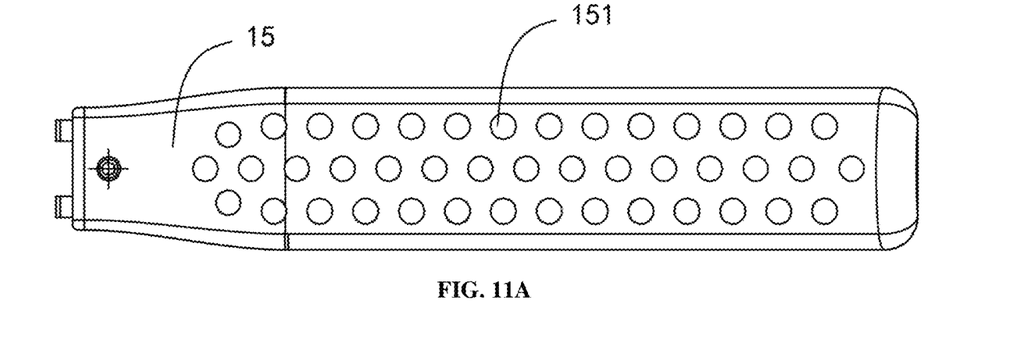
FIG. 11A is a structural schematic diagram of a first front cover according to the present disclosure.
Figure 11B:
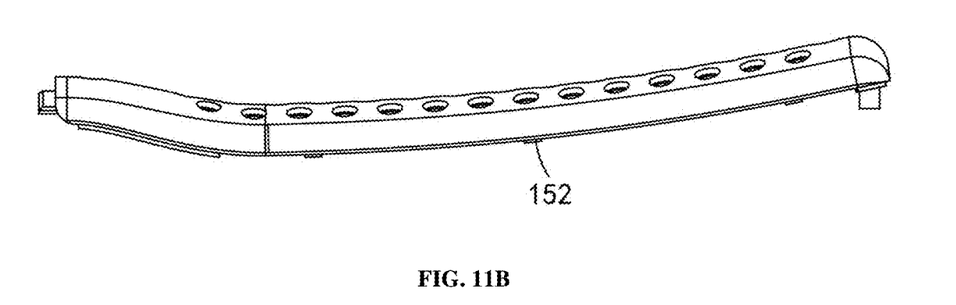
FIG. 11B is a structural schematic diagram of a first front cover according to the present disclosure from another perspective.
Figure 12:
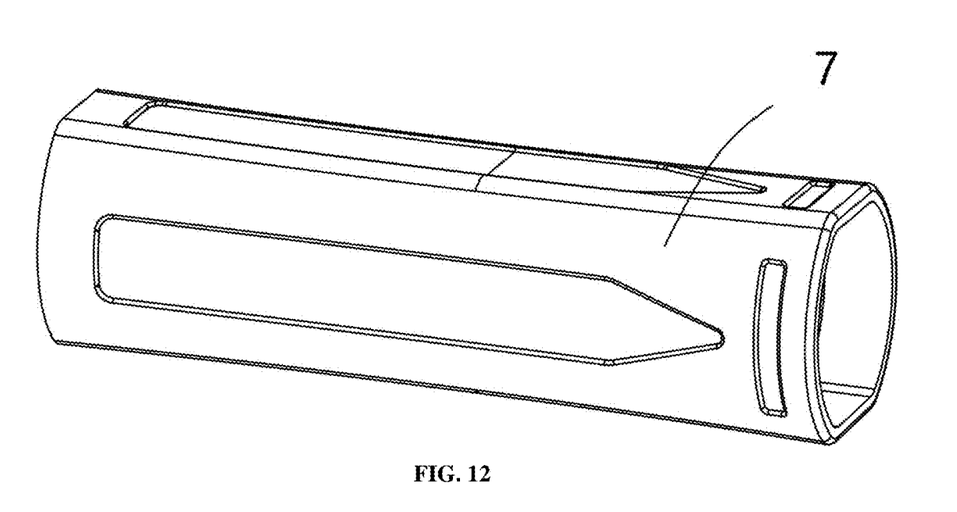
FIG. 12 is a structural schematic diagram of a rubber sleeve according to the present disclosure.

Further, the upper surface of the first front cover 15 of the water-spraying and bathing comb main body 1 has three rows of circular holes 151 with the same diameter; the upper surface of the water-spraying and bathing comb water outlet main body 6 has conical toothed water outlet channels 61; the water outlet channels 61 pass through the circular holes 151 and are located above the upper surface of the first front cover 15; the diameter of the water outlet channels 61 away from the upper end face of the first front cover 15 is less than that of one end in contact with the upper surface of the first front cover 15; and a pressurizing structure is formed, so that the pressure is increased during water output, and a length of the comb teeth 4 is the same as that of the water outlet channels 61. Preferably, two inserting buckle ribs 152 are arranged at the bottom end of the first front cover 15 and are configured to fix the first front cover 15 and the first rear cover 14 of the water-spraying and bathing comb main body. Preferably, three rows of convex conical toothed water outlet channels 61 are formed at the front side of the upper surface of the water-spraying and bathing comb water outlet main body 6; a long U-shaped water-dividing wall 64 is arranged on a back side and divides three rows of water outlet channels 61 with the same diameter into two water channels, namely first water path channels 11 and a second water path channel 12; two square water inlet holes are formed at the bottom end of the water-spraying and bathing comb water outlet main body 6 and are connected to the two water path channels; one column in the middle and two columns on the sides are respectively independent water paths; and optionally, one water outlet channel 61 in the middle has four solid bottom ends, so that the problems of water pressure and the shortened water outlet area can be solved. Through the improvement on the water path structure, the first water path channels 11 and the second water path channel 12 are provided, the connection or disconnection of the first water path channels 11, the connection or disconnection of the second water path channel 12, or the connection or disconnection of the first water path channels 11 and the second water path channel 12 can be controlled according to requirements, the water amount is adjusted, and the water amount is selected according to the volume and the hair amount of a pet, thereby achieving a water-saving effect and ensuring that the hair of the pet can be completely washed; secondly, a water-spraying nozzle is set to be conical, the structure of a water outlet is improved, and the height of a water-spraying nozzle is increased, so shat the washing area is increased; multiple rows of conical water-spraying nozzles form a toothed structure, so that the pets can be massaged while being washed and the comfortability of the pets can be improved; comb teeth are added to the front end face and the rear end face of the water-spraying and bathing comb main body, and the lengths of the comb teeth are limited, so that the floating hair on the pets can be brushed off when the pets are brushed; the skin layer deep in the hair of the pets can be cleaned, and dirt can be removed from the skin layer of the pets; the massage effect is achieved while washing, so that the comfortability of the pets in the hair washing process can be improved; and dirt in the hair can be brushed off in the pet washing process, so that the practicability is improved.

Figure 8:
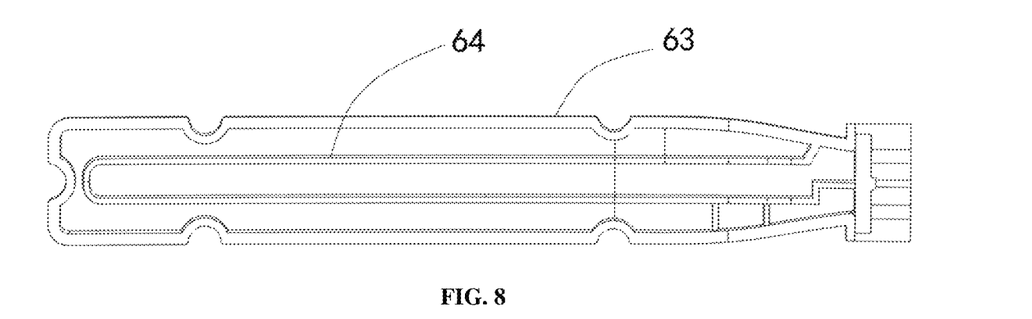
FIG. 8 is a structural schematic diagram of a second rear cover according to the present disclosure.
Figure 9A:
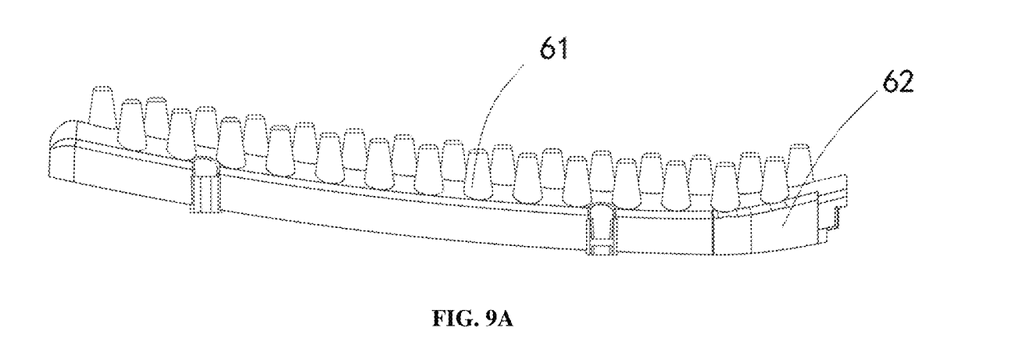
FIG. 9A is a structural schematic diagram of a second front cover according to the present disclosure.
Figure 9B:
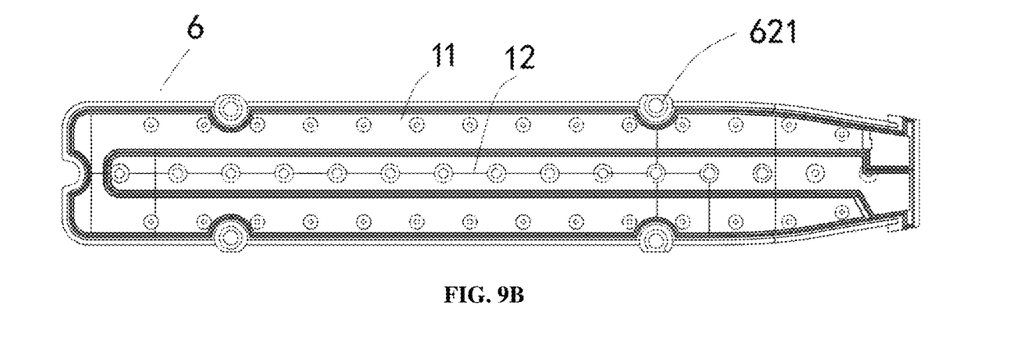
FIG. 9B is a structural schematic diagram of a second front cover according to the present disclosure from another perspective.
Figure 10A:
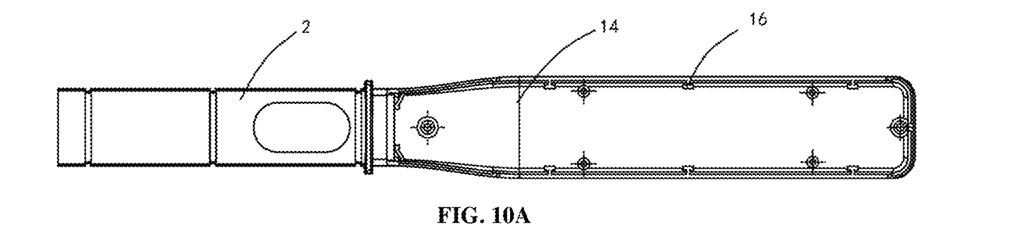
FIG. 10A is a structural schematic diagram of a first rear cover according to the present disclosure.
Figure 10B:
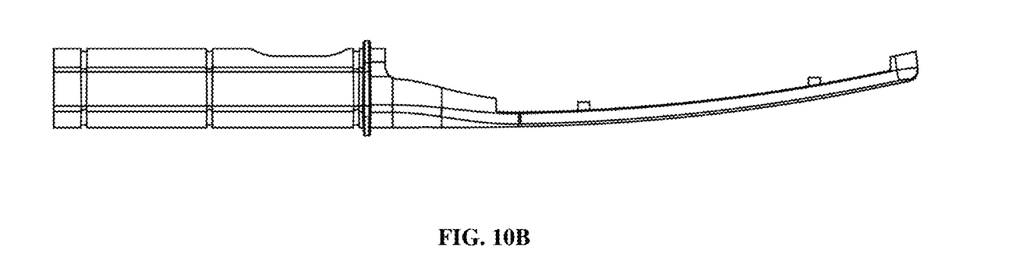
FIG. 10B is a structural schematic diagram of a first rear cover according to the present disclosure from another perspective.

Further, the water-spraying and bathing comb water outlet main body 6 has a second front cover 62 and a second rear cover 63 fixedly connected to the second front cover 62; fixed screw holes are respectively formed at two sides of an upper surface of the second front cover 62 in a length direction and are configured to be fixedly connected to the second rear cover 63 of the water-spraying and bathing comb water outlet main body; and preferably, a semicircular groove is formed at the top end of the second front cover 62 of the water-spraying and bathing comb water outlet main body 6, which can leave a space for the screws of the first front cover 15 and the first rear cover 14 of the water-spraying and bathing comb main body 1.

Further, a semicircular groove is formed at each of two sides of the second rear cover 63 of the water-spraying and bathing comb water outlet main body 6, which can leave a space for the screws of the first rear cover 14 of the water-spraying and bathing comb main body 1 and the water-spraying and bathing comb water outlet main body 6. Preferably, two elliptic water inlets are formed at the bottom end of the second rear cover 63 of the water-spraying and bathing comb water outlet main body 6; the inner diameter is enlarged in a stepped manner, which reserves a scaling ring mounting space for the position where the water path controller 8 is connected to the water-spraying and bathing comb water outlet main body 6; a sealing ring is arranged at a position where the water path controller 8 is connected to the water-spraying and bathing comb water outlet main body 6; and the sealing ring is placed between a water outlet of the water path controller central hub 82 and a water inlet at the bottom of the second rear cover 63 of the water-spraying and bathing comb water outlet main body 6, and is configured to seal a water path. Preferably, a screw-fixing base is arranged between the two elliptic water inlets and is configured to be fixedly connected to the first front cover 15 of the water-spraying and bathing comb main body 1 and the water-spraying and bathing comb water outlet main body 6.

In this embodiment, the handle 2 has a second accommodating cavity; a left end of the second accommodating cavity communicates with a water path connecting pipe 3; a water path connecting port 24 is formed at a right end of the second accommodating cavity; a right end of the water path connecting port 24 is in sleeving connection with a right end of a water inlet port 13; a scaling ring is arranged outside the right end of the water path connecting port 24; a water path controller 8 is arranged in the second accommodating cavity; and the water path controller 8 includes a water path controller rear cover 81, a water path control central hub 82 and a water path controller front cover 83. Two buckles are arranged at the top of the water path controller rear cover 81 and are configured to fix the left-right blocking rib at the junction of the handle 2 of the water-spraying and bathing comb main body 1; three screw holes are formed at each of two sides of the water path controller rear cover 81; three screw-fixing bases are respectively and correspondingly arranged on the left side and the right side of the water path controller central hub 82; the screw holes and the screw-fixing bases are fixed to realize the fixed connection therebetween; the middle part and the bottom of the water path controller 8 are respectively provided with a half-angle arc-edge spare fixed rib is arranged; a circular second water-passing cavity 811 and a first water-passing cavity 812 are formed in the water path controller rear cover 81; the first water-passing cavity 812 has a special-shaped structure, and has a mounting part 8121 and a flow guide part 8122; the flow guide part 8122 has a rectangular groove structure and has a width less than a diameter of the mounting part 8121 and a diameter of the second water-passing cavity 811; water flow flows to the second water-passing cavity 811 through the flow guide part 8122; the rectangular flow guide part 8122 with a small width is arranged, so water flow converges to the flow guide part 8122 to compress the water amount and then passes through the second water-passing cavity 811 to realize first pressurization; preferably, a vertical plate is arranged between the second water-passing cavity 811 and the first water-passing cavity 812, the vertical plate is provided with a water through hole 814, the second water-passing cavity 811 and the first water-passing cavity 812 communicate with each other through a water through hole 814, and the water through hole 814 may be a circular hole, may be a rectangular hole, preferably arch-shaped; hollow cylinders 88 are vertically arranged at the cavity centers of the second water-passing cavity 811 and the first water-passing cavity 812; reset springs 57 are sleeved on the hollow cylinders 88; and the diameters of inner walls of the second water-passing cavity 811 and the first water-passing cavity 812 are enlarged in a stepped manner for mounting a sealing ring. A scaling ring is also arranged between the water path controller central hub 83 and the first rear cover 14 of the water-spraying and bathing comb main body 1, and is configured to seal a water path.

Figure 13:
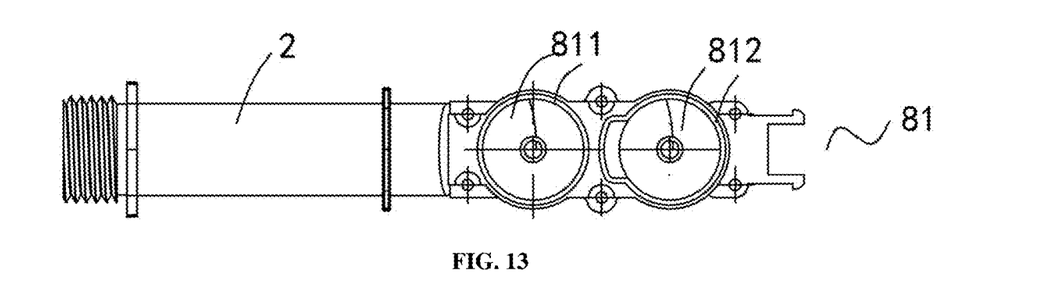
FIG. 13 is a structural schematic diagram of a water path controller rear cover according to the present disclosure.

Further, water-passing holes 813 are formed in the first water-passing cavity 812 and the second water-passing cavity 811. Preferably, two water-passing holes 813 are formed in each of the first water-passing cavity 812 and the second water-passing cavity 811 and are distributed in a mirrored mode. The water-passing hole has a fan-shaped structure or may select a semicircle, thereby ensuring insufficient water input and uniform distribution of the water amount.

Figure 1:
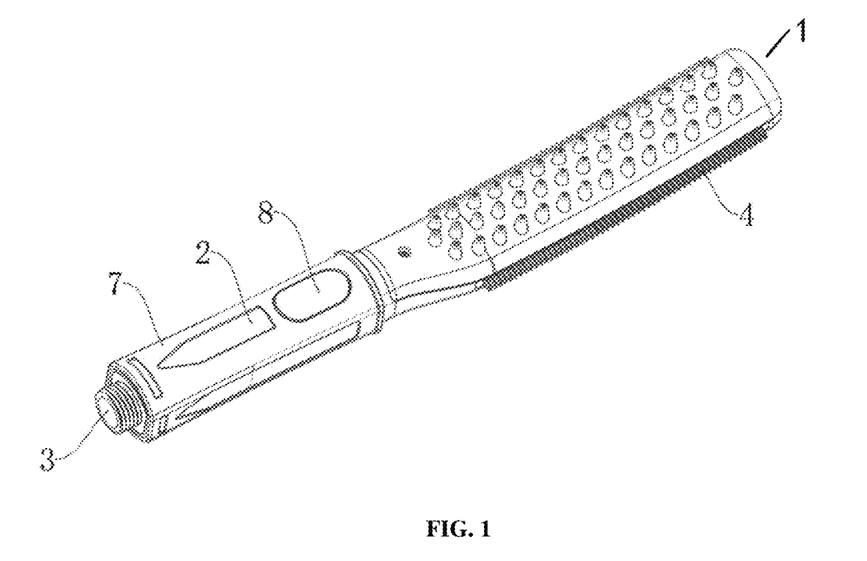
FIG. 1 is a schematic diagram of an overall three-dimensional structure according to the present disclosure.
Figure 2:
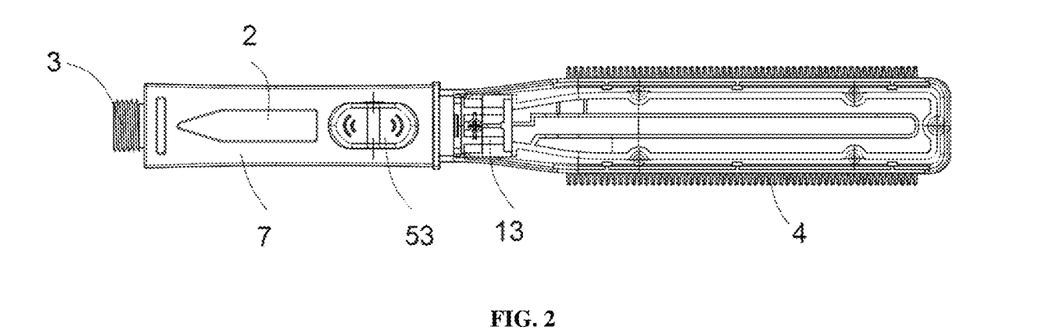
FIG. 2 is a schematic diagram of a connecting structure of a handle and a first rear cover according to the present disclosure.
Figure 3:
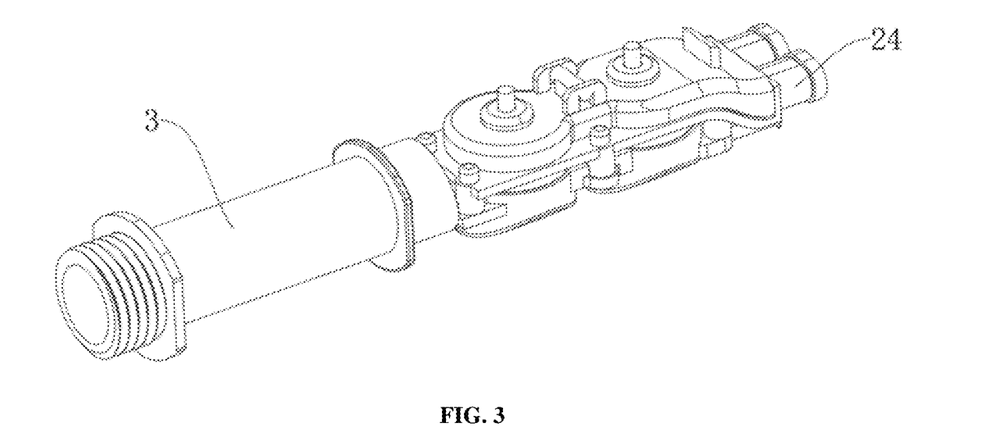
FIG. 3 is a schematic diagram of a connecting structure of a water path connecting pipe, a water path connecting port and a water path controller according to the present disclosure.
Figure 4:
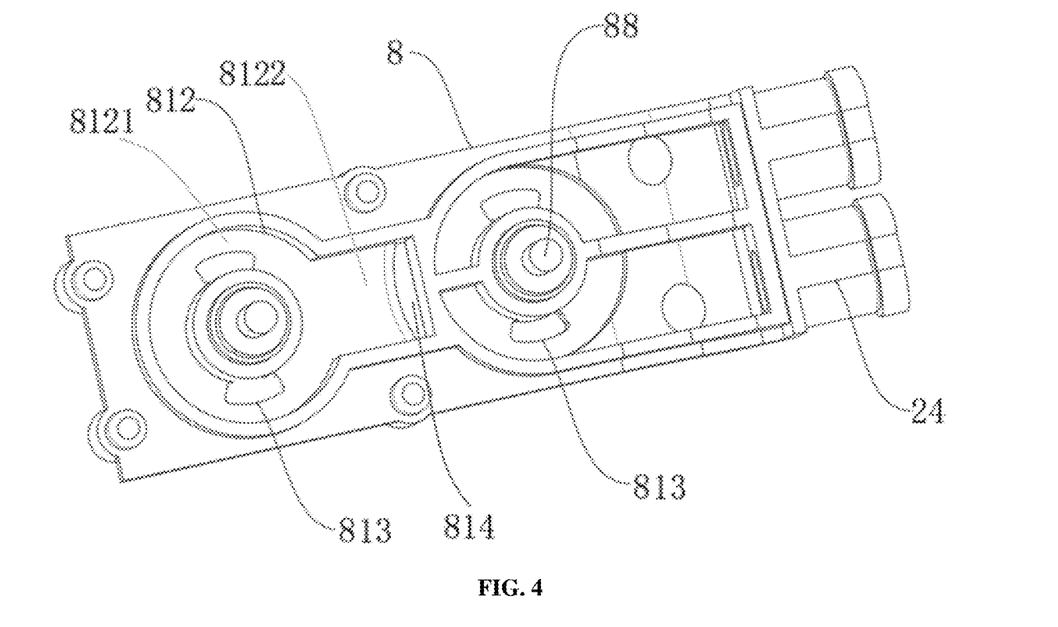
FIG. 4 is a schematic diagram of a top-view structure of a water path controller central hub according to the present disclosure.
Figure 5:
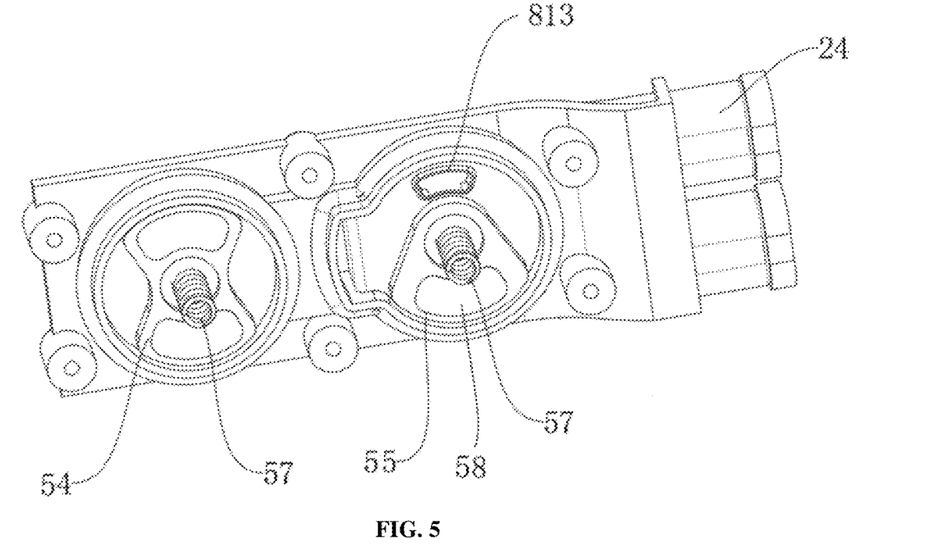
FIG. 5 is a schematic diagram of a bottom-view structure of a water path controller central hub according to the present disclosure.
Figure 6:
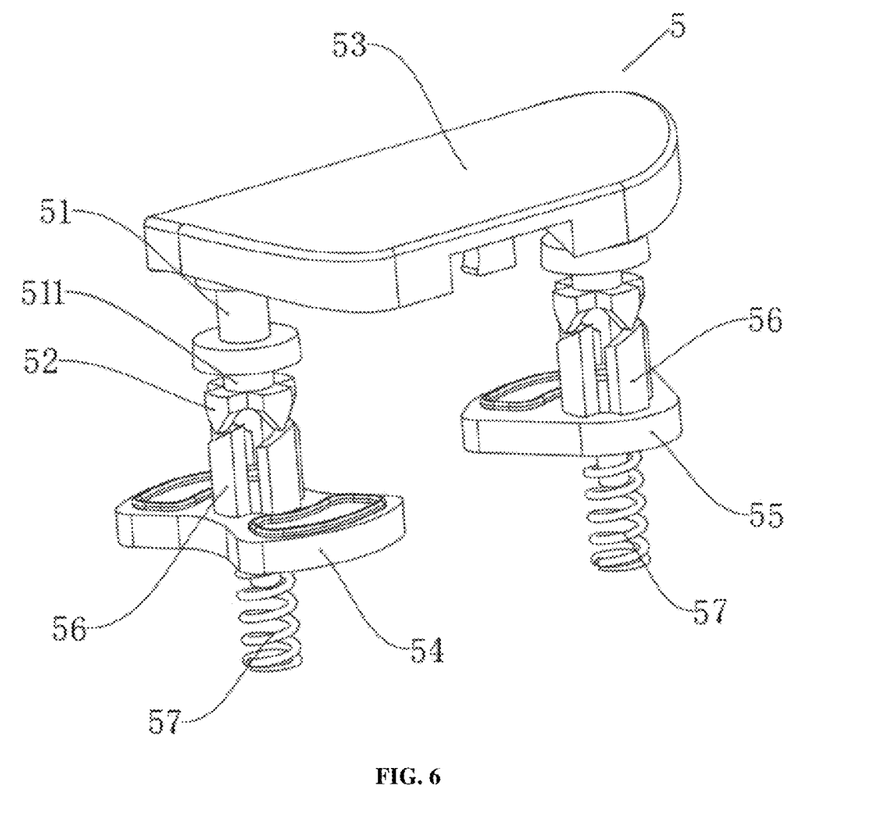
FIG. 6 is a structural schematic diagram of a switch assembly according to the present disclosure.
Figure 7:
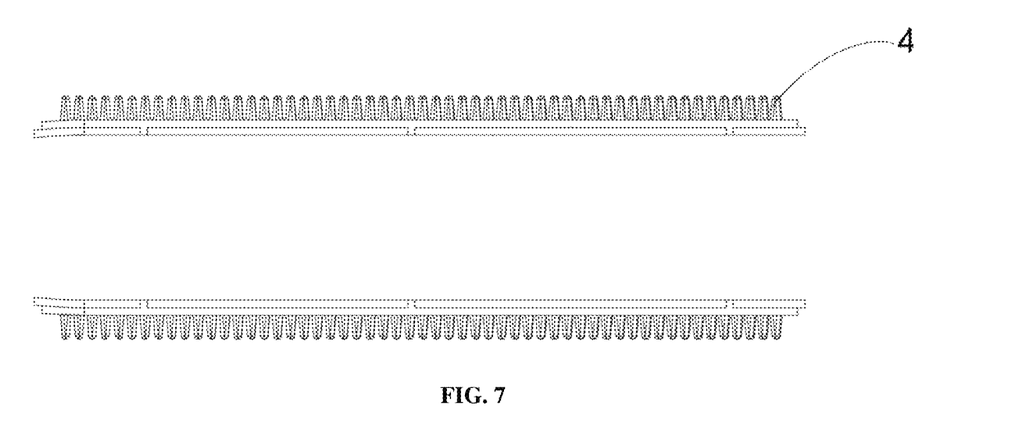
FIG. 7 is a structural schematic diagram of a toothed comb according to the present disclosure.
Figure 15:
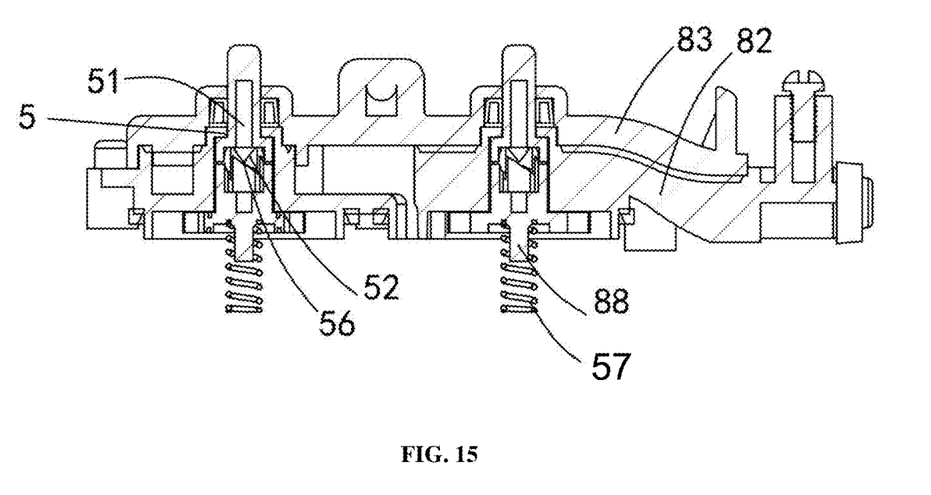
FIG. 15 is a structural schematic diagram of a connecting structure of a water path controller and a switch assembly according to the present disclosure.

Specifically, the water path controller central hub 82 is controlled by a switch assembly 5; the switch assembly 5 includes a main shaft 51, driving clamping teeth 52, a water path controller button 53, a first button pick 54, a second button pick 55, driven clamping teeth 56 and reset springs 57; an upper end face of the handle 2 is in sliding connection with the water path controller button 53; an upper end face of the water path controller button 53 and a surface of the handle 2 are matched with each other; sealing rubber sheets are arranged on the first button pick 54 and the second button pick 55; button main shafts 51 are fixedly mounted on left and right sides of a lower end of the water path controller button 53; the button main shafts 51 have driving ends 511; outer surfaces of the driving ends 511 are fixedly connected to the driving clamping teeth 52; the driving clamping teeth 52 and the driven clamping teeth 56 are matched with each other; preferably, one side of each of the driving clamping teeth 52 facing the driving clamping teeth is a working end, the working end of each of the driving clamping teeth 52 is a sharp corner, the upper surface of each of the driven clamping teeth 56 is an inclined surface, the working end of the each of the driving clamping teeth 52 is in contact with the inclined surface of each of the driven clamping teeth 56, a downward force is applied by the button main shafts 51, and an extruding force is applied to the inclined surface of each of the driven clamping teeth 56, so that the driven clamping teeth 56 rotate; the bottoms of two driven clamping teeth 56 are respectively and fixedly connected to the first button pick 54 and the second button pick 55; the driven clamping teeth 56 rotate to drive the first button pick 54 and the second button pick 55 to rotate horizontally, so that the function of connecting and disconnecting the water-passing hole 813 is achieved; the first button pick 54 is located in the first water-passing cavity 812, and the second button pick 55 is located in the second water-passing cavity 811; optionally, the first button pick 54 has a mirror structure, and the first button pick 54 has an integrally closed structure, so that the two water-passing holes 813 arranged in a mirrored manner can be blocked, preferably, a butterfly structure design; a detachable stop block 58 is arranged on the first button pick 54; the size of the detachable stop block 58 corresponds to the shape and size of the water-passing hole 813; the second button pick 55 has a single-sheet structure and can block one water-passing hole 813; the second button pick 55 has an integrally closed structure, preferably, a fan-shaped structure design; the second button pick 55 is provided with the detachable stop block 58, and the size of the detachable stop block 58 corresponds to the shape and size of the water-passing hole 813; the left side or right side of the water path controller button 53 is pressed, so that the corresponding button main shaft 51 moves downwards, and the driving clamping teeth 52 and the driven clamping teeth 56 are attached to push the driven clamping teeth 56 to rotate, thereby controlling the corresponding button pick and facilitating the button pick to close or open the water-passing hole 813; when not in use, the first button pick 54 and the second button pick 55 are at the positions where the corresponding water-passing holes 813 are blocked; when in use, the left side of the water path controller button 53 is pressed, so that the first button pick 54 rotates and communicates with the water-passing hole 813 of the first water-passing cavity 812, so that the second water path channel 12 is communicated, and the water outlet channel 61 corresponding to the second water path channel 12 outputs water; the right side of the water path controller button 53 is pressed once again, so that two water-passing holes 813 of the second water-passing cavity 811 are in a communicating state, and two first water path channels 11 and one second water path channel 12 output water; the water path controller button 53 is pressed again, so that one water-passing hole 813 of the second water-passing cavity 811 is blocked, one water path channel 11 supplies water, and the water outlet channel 61 corresponding to the single side outputs water; the water path controller button 53 is pressed again, so that the first water path channels 11 on two sides supply water, and the water outlet channels 61 corresponding to two sides output water; and it is unnecessary to output water temporarily, the left side of the water path controller button 53 is pressed to block the water-passing hole 813 of the first water-passing cavity 812, so that the water path is disconnected temporarily.

Figure 14:
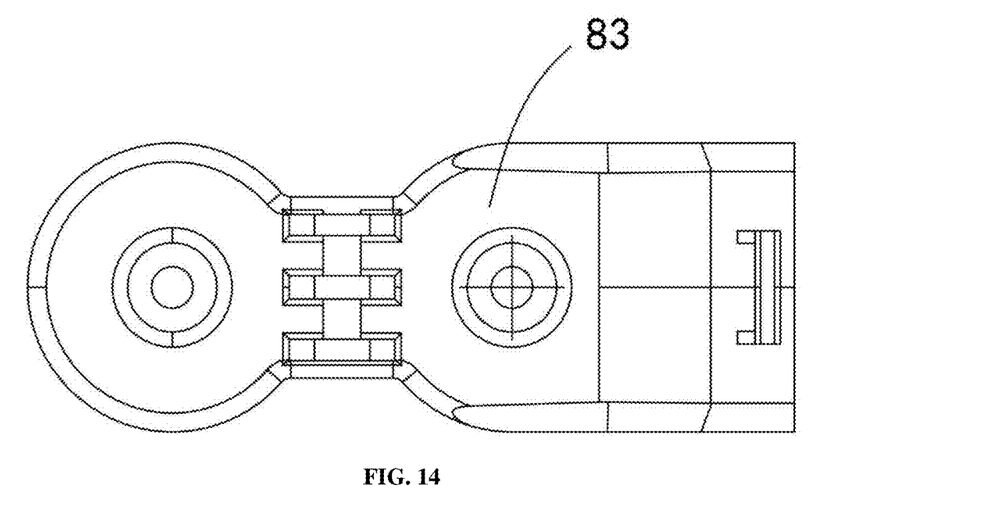
FIG. 14 is a structural schematic diagram of a water path controller front cover according to the present disclosure.

In this embodiment, a sealing ring is arranged between the water path controller front cover 83 and the water path controller central hub 82, and the water path controller front cover and the water path controller central hub are hermetically connected through ultrasonic waves; and the middle part and the bottom of the water path controller front cover 83 are provided with two circular holes to serve as the channels of the button main shafts 51 of the water path controller 8.

A heightening beam is arranged between the two circular holes to serve as a supporting point of the water path controller button 84, so that the water path controller button 84 can swing towards two sides of the heightening beam, and the button main shafts 51 located on two sides of the heightening beam are driven as required. Preferably, the water path controller button 84 is elliptic, and a semicircular groove rectangular fixed rib is arranged towards one side of the water path controller front cover 83 and is linked with the heightening beam of the water path controller front cover 83, so that the smoothness of the water path controller button 84 is improved.

The working principle is: firstly, during use, a water path connecting pipe is mounted on a water outlet tap of a shower, so that the water outlet tap is turned on, water flow enters the water-spraying and bathing comb through the water path connecting pipe; when the pet is bathed, people hold a handle part, the holding stability is enhanced by the handle rubber-coating sleeve, a conical water nozzle sprays water for bathing; the structure of the water outlet is improved and the height of the water nozzle is increased, so that the water output pressure is higher, and the washing area is enlarged; meanwhile, multiple rows of the conical nozzles form a toothed structure, so that the pet can be massaged while being washed, and the comfortability of the pet can be improved; the comb teeth are added to two sides of the water-spraying and bathing comb main body, so that the floating hair on the body of the pet can be brushed off better when the pet is washed, the hair can be combed in the washing process of the pet, dirt in the hair can be brushed off, and the practicability is improved; meanwhile, when entering the water-spraying and bathing comb, water flow firstly enters the second water-passing cavity through the water path connecting pipe, so that water flow flows into the first water-passing cavity through the corresponding water-passing hole and finally enters the water path channel; therefore, in the bathing process, by pressing the left side or right side of the water path controller button, the corresponding button main shaft moves downwards, the driving clamping teeth and the driven clamping teeth are attached to push the driven clamping teeth to rotate, so that the button pick can be controlled, it is convenient for the button pick to close or open the water-passing hole; and the design of multiple water outlet modes and the one-button water-stopping function of pausing water flow at any time can avoid the trouble of wasting water or closing a water tap valve.

During use, water flow enters the cavity of the first water-passing cavity located below the water path controller central hub through the water path connecting pipe, and flows into the cavity of the first water-passing cavity above the water path controller central hub through the water-passing hole, so that the water flow flows into the cavity of the second water-passing cavity located below the water path controller central hub through the water-passing hole, flows into the cavity of the second water-passing cavity above the water path controller central hub through the water-passing hole of the second water-passing cavity, and then enters into the water path channel inside and communicating with the water-spraying and bathing comb main body through the water path connecting port.

The technical problem solved by the present disclosure is: larger water outlet area is more suitable for washing the body shape of the pet; the comb teeth on the sides serve as a comb to comb off the floating hair in the air; a water outlet of a bathing brush and two sides of the bathing brush main body are shaped like comb teeth, so that the hair of the pet can be brushed during bathing, and the dirt in the hair can be brushed off. The operations of all function switches are integrated into one button, so during use, it is necessary to realize three water outlet modes and turn off the water path with a single hand; and the one-button water-stopping function can pause the water flow at any time, thereby the trouble of wasting water or closing the water tap valve. The small water mode has small water flow area and high pressure, which is especially suitable for washing pet paws. The big water mode has large water flow area and high pressure, which is suitable for washing the thick hair of the pet, going deep into the hair and completely cleaning. A mixed water mode has large water flow and moderate pressure, which is suitable for washing foam for pets or cleaning bellies or other sensitive parts.

It should be noted that the terms used herein are merely used to describe the specific embodiments, but are not intended to limit exemplary embodiments of the present application. As used herein, the singular form is also intended to include the plural form unless otherwise indicated obviously from the context. Furthermore, it should be further understood that the terms "includes" and/or "including" used in this specification specify the presence of stated features, steps, operations, elements, components and/or their groups.

Meanwhile, it should be understood that for the convenience of description, the dimensions of each part shown in the accompanying drawings are not drawn according to the actual proportional relationship. Technologies, methods and devices known to those of ordinary skill in the related field may not be discussed in detail, but, where appropriate, technologies, methods and devices should be regarded as a part of the authorized specification. In all the examples shown and discussed herein, any specific value should be interpreted as merely exemplary rather than a limitation. Therefore, other examples of the exemplary embodiments may have different values. It should be noted that similar reference numerals and letters represent similar items in the accompanying drawings below. Therefore, once a certain item is defined in one drawing, it is unnecessary to further discuss the item in the subsequent drawings.

In the description of the present application, it should be understood that an azimuth or position relationship indicated by azimuth words "front, rear, upper, lower, left, right" and the like is generally an azimuth or position relationship based on the accompanying draws, which is only for facilitating description of the present application and simplifying description. In the absence of a statement to the contrary, these azimuth words do not indicate and imply that the referred device or component must have a specific azimuth or perform construction and operation in the specific azimuth; therefore, it cannot be interpreted as a limitation to the protection scope of the present application. The azimuth words "inner, outer" refer to the inside and outside relative to the outline of each component itself.

For the convenience of description, spatially relative terms may be used herein, for example, "over", "above", "on the upper surface", "on" and the like are used to describe a spatial position relationship between one device or feature shown in the figure and other devices or features. It should be understood that the spatial relative terms are intended to include different orientations in use or operation in addition to the orientations of the devices described in the figures. For example, if the device in the drawings is inverted, the device described as "above other devices or structures" or "over other devices or structures" will be positioned as "below other devices or structures" or "under other devices or structures". Therefore, the exemplary terms "above" may include two orientations: "above" and "below".

In addition, it should be understood that the words "first", "second" and the like for limiting parts are merely for the convenience of distinguishing corresponding parts. Unless otherwise stated, the above words do not have special meanings and cannot be construed as limitations to the protection scope of the present application.

In the description of the present disclosure, it should be noted that unless other specified and limited, the terms "mount", "provided with", "connection" and the like should be understood in a broad sense, for example, "connection" may be fixed connection, detachable connection or integrated connection, or may be mechanical connection or electrical connection, or may be direct connection, indirection connection through an intermediate medium or communication of two elements. For those of ordinary skill in the art, the specific meaning of the terms in the present disclosure may be understood according to specific situations.

The afore-mentioned are only preferred embodiments of the present disclosure, and all equivalent changes and modifications made in accordance with the claims of the present disclosure shall fall within the scope of the present disclosure.

The invention claimed is:

1. A water-spraying shower comb for pets, comprising a main housing (1), wherein a handle housing (2) is arranged at an left end of the main housing (1), a water passage connecting pipe (3) is arranged at a left end of the handle housing (2), comb teeth (4) are formed at front and rear ends of an outer side of the main housing (1) respectively, a conical water spray nozzle I (5) is arranged on an upper end surface of the main housing (1), a conical water spray nozzle II (6) is arranged on front and rear sides of the upper end surface of the main housing (1) respectively, a handle rubber sleeve (7) is arranged on an outer side of the handle housing (2), and a water passage control assembly (8) is arranged on an upper end surface of the handle housing (2); and     a first water passage channel (11) and a second water passage channel (12) are arranged on an inner side of the main housing (1) respectively, the second water passage channel (12) is located on an inner side of the first water passage channel (11), left ends of the first water passage channel (11) and the second water passage channel (12) are connected to a water inlet port (13) respectively, the first water passage channel (11) and the second conical water spray nozzle II (6) are connected to each other, and the second water passage channel (12) and the first conical water spray nozzle I (5) are connected to each other.

2. The water-spraying shower comb for pets according to claim 1, wherein a diversion control plate (21) is arranged on an inner side of the handle housing (2), a lower cover plate (22) is installed at a lower end of the diversion control plate (21), an upper cover plate (23) is installed at an upper end of the diversion control plate (21), a water passage connection port (24) is arranged at a right end of the diversion control plate (21), a left end of the lower cover plate (22) is fixedly connected to the water passage connection pipe (3), an inner side of the lower cover plate (22) and the water passage connection pipe (3) are connected to each other, a right end of the water passage connection port (24) is sleeved with a left end of the water inlet port (13), a sealing ring is arranged on an outer side of a right end of the water passage connection port (24), and a hinge seat (231) is fixedly connected to an upper end of the upper cover plate (23).

3. The water-spraying shower comb for pets according to claim 2, wherein a lower water passing cavity (211) is arranged at a lower end of the diversion control plate (21), an upper water passing cavity (212) is arranged at an upper end of the diversion control plate (21), the lower water passing cavity (211) and the upper water passing cavity (212) are connected to each other through a water passing hole (213), a positioning seat (214) is arranged on an inner side of the upper water passing cavity (212), and a right end of the upper water passing cavity (212) and the water passage connection port (24) are connected to each other.

4. The water-spraying shower comb for pets according to claim 3, wherein the water passage control assembly (8) comprises key spindles (81), driving clamping teeth (82), a pressing plate (83), a first key plectrum (84), a second key plectrum (85), driven clamping teeth (86) and reset springs (57), wherein an upper end surface of the handle housing (2) is slidably connected to the pressing plate (83), the key spindles (81) are fixedly installed on left and right sides of an lower end of the pressing plate (83), a lower end of the key spindle (81) extends to the positioning seat (214) and is fixedly connected with the driving clamping teeth (82), the first key plectrum (84) and the second key plectrum (85) are arranged on left and right ends of an inner side of the lower water passing cavity (211) respectively, upper ends of the first key plectrum (84) and the second key plectrum (85) are fixedly connected with the driven clamping teeth (86) respectively, and the reset springs (57) are arranged at lower ends of the first key plectrum (84) and the second key plectrum (85).

5. The water-spraying shower comb for pets according to claim 4, wherein the key spindle (81) is slidably connected to the positioning seat (214), the driving clamping teeth (82) and the driven clamping teeth (86) are matched with each other, an upper end surface of the pressing plate (83) and a surface of the handle housing (2) are matched with each other, the first key plectrum (84) is designed to have a butterfly-shaped structure, the second key plectrum (85) is designed to have a fan-shaped structure, both the first key plectrum (84) and the second key plectrum (85) are matched with the water passing hole (213), and a lower end of the reset spring (57) is in fit connection with the lower cover plate (22).

\* \* \* \* \*